United States Patent [19]

Fouss et al.

[11] 4,247,136
[45] Jan. 27, 1981

[54] INTERNAL COUPLING STRUCTURE AND JOINT FOR PIPE OR TUBING

[75] Inventors: James L. Fouss; Donald W. Sting; John J. Parker; Robert Biango, all of Findlay, Ohio

[73] Assignee: Hancor, Inc., Findlay, Ohio

[21] Appl. No.: 972,520

[22] Filed: Dec. 22, 1978

[51] Int. Cl.³ .............................................. F16L 21/00
[52] U.S. Cl. .................................. 285/319; 285/383; 285/397; 285/423; 285/DIG. 4; 285/DIG. 22
[58] Field of Search ................. 285/DIG. 4, 423, 424, 285/319, DIG. 22, 371, 397, 383

[56] References Cited

U.S. PATENT DOCUMENTS

| 1,033,187 | 7/1912  | Metzger    | 285/87       |
| 3,245,703 | 4/1966  | Manly      | 285/DIG. 2   |
| 3,695,643 | 10/1972 | Schmunk    | 285/DIG. 4   |
| 3,785,682 | 1/1974  | Scholler   | 285/DIG. 4   |
| 3,825,288 | 7/1974  | Moroschak  | 285/DIG. 4   |
| 3,897,090 | 7/1975  | Moroschak  | 285/DIG. 4   |
| 3,926,222 | 12/1975 | Shroy et al. | 285/DIG. 4 |
| 3,937,547 | 2/1976  | Lee-Kemp   | 285/314 X    |
| 4,082,327 | 4/1978  | Sting et al. | 285/423    |

OTHER PUBLICATIONS

*Agri-Book Magazine*, vol. 4, #12, Jun. 1978, pp. 1, 20 and 52.

*Primary Examiner*—Dave W. Arola
*Attorney, Agent, or Firm*—Fay & Sharpe

[57] ABSTRACT

A coupler structure which facilitates the internal joining of a first length of hollow plastic pipe having internal corrugations defined by a plurality of alternating peaks and valleys to a second length of similar pipe or to some other structure. The coupler is molded from plastic to have at least one cylindrical end portion dimensioned for longitudinal receipt in the second length of tubing or other structure which is to be coupled to the first length. This one end portion includes a plurality of integrally molded cleats extending generally radially outward thereof. The cleats are selectively movable between first locking positions for lockingly engaging the second tubing length valleys and second non-locking positions which permits forced insertion of the coupler one end portion into the second tubing length. The cleats are hinged to the one end portion generally laterally thereof and are continuously urged toward the first position by the resilient nature of the plastic construction. A tab or tongue-like structure extends outwardly from each cleat generally longitudinal of the coupler one end and is dimensioned to extend beneath the next adjacent second tubing peak when the cleat is in locking engagement with a second tubing length valley. This, in turn, acts to energize the cleat to enhance its locking capabilities when a pull force is applied to the tubing. The coupler preferably comprises a separate structure including a pair of generally opposed end portions for joining two similar lengths of plastic pipe. The coupler also preferably includes flexure means intermediate the end portions to accommodate bending at the tubing joint.

40 Claims, 8 Drawing Figures

INTERNAL COUPLING STRUCTURE AND JOINT FOR PIPE OR TUBING

BACKGROUND OF THE INVENTION

This application is directed to the art of pipe joints and couplings and more particularly to an internal joint or coupling construction for plastic pipe or tubing.

The invention is particularly applicable to connecting adjacent ends of corrugated plastic pipe or tubing lengths and will be described with particular reference thereto. However, it will be appreciated that the invention has broader applications and may be incorporated as an integral part of the tubing or may be sized and configured to accommodate connecting of different tubing sizes and/or alternate connecting applications.

Corrugated plastic pipe or tubing is widely used for many types of domestic, agricultural and industrial drainage systems. This pipe or tubing is typically molded from high density polyethylene and polyvinylchloride and is generally supplied in continuous lengths. These lengths may be connected together and/or cut into shorter lengths for meeting particular installation needs. The pipe itself is generally cylindrical and has corrugated internal and external wall surfaces defined by adjacent circumferentially extending, longitudinally spaced peaks and valleys over the lengths thereof.

When installing such pipe or tubing in the ground for drainage purposes, it is oftentimes necessary to connect the ends of two pipe lengths during the process. Heretofore, there have been many different types and styles of joints or couplers which have been developed for this purpose. Particular emphasis has been placed on making these joints and couplings simple in construction to facilitate ease of assembly and cost savings. Simplicity of assembly reduces the time necessary to lay drainage pipe and, therefore, its effective cost. If a number of manipulations are necessary to physically connect the adjacent pipe ends, the overall cost of the installation will be increased. Such cost increases can become particularly significant when laying a substantial length or amount of such pipe.

Prior joints or couplings have typically comprised the so called external type couplers which fit on the outside of the lengths of pipe at the joint area. Many external coupler designs have been developed and introduced for practical application. Some of these comprise wrap around types which fasten with snap buttons, belts or the like. Spiral tubing manufacturers utilize a screw on swivel type of coupler which snaps together. Still other designs have comprised so-called split type couplers which require being wrapped with tape, twine or wire.

While many of these external couplers have proved reasonably successful in accomplishing the intended results, they do have certain inherent difficulties which detract from their use in automatic pipe laying machines. That is, many external couplers are too large in diameter to pass through the feeding devices on most such machines. Indeed, and especially with high speed drain tube type plows, the external couplers are often damaged so that there is a loss of integrity in the joint between the two tubing sections and/or these sections may be uncoupled during the installation process. With split type coupler designs, the feeding process often rips the tape or twine such that the coupler can become unfastened. Moreover, wrapping twine, snapping buttons and fastening belts all require additional assembly time for making up the joint in the first instance.

There have also been some prior development efforts directed to incorporating integrally molded internal and/or external coupling arrangements in the tubing as it was molded. Typically, such integrally formed coupling arrangements were disposed at repetitive spaced apart distances along the tubing length and included special structural provisions and designs for both the male and female coupling components. Because of the specialized nature of the coupling component designs, they necessarily require special and intricate molds which, in turn, increase cost for the tubing manufacture and installation.

It has been found desirable to eliminate the above noted problems with prior coupling arrangements through development of an internal coupler structure. To that end, the present invention contemplates a new and improved internal coupling arrangement which is simple, economical, facilitates the positive locking of adjacent lengths of pipe, has a self actuating feature which enhances the coupling strength when a pull force is applied thereagainst, permits adjacent lengths of pipe to be bent at sharp angles to each other without disturbing the integrity of the joint, which does not adversely affect the fluid flow capacity of the pipe, and which is readily adapted to use for a number of alternative applications in the same or different environments.

BRIEF DESCRIPTION OF THE INVENTION

In accordance with the present invention, there is provided a coupler or joint for coupling a first length of hollow tubing to some piece of associated structure. The first length of tubing has a generally cylindrical configuration including internal, generally circumferential corrugations defined by alternating peaks and valleys disposed at least adjacent the open end thereof which is to be joined to some associated structure. The coupler comprises a coupler body having a first generally cylindrical end portion dimensioned to be received in the first tubing length open end. A plurality of cleats are disposed on this end portion with each being hinged along a cleat mounting axis for selective cleat movement between a first normal position extending radially outward of the end portion and a second position arcuately spaced from the first position inwardly toward the end portion. Means are provided for continuously urging the cleats toward the first position. With this construction, the coupler first end portion is adapted to be longitudinally inserted into the open end of the first tubing length in a manner such that the cleats will be forced from the first toward the second position as they engage the internal tubing peaks and will then be moved back to the first position by the urging means as they become aligned with the tubing valleys in order to retain the first tubing length on the coupler.

In accordance with another aspect of the present invention, each cleat includes a wall engaging surface adapted to engage that portion of a corrugation wall disposed between the associated tubing valley and the next adjacent peak toward the tubing open end.

In accordance with another aspect of the present invention, each cleat also includes a rear wall tapering upwardly from the coupler body end portion at the hinge area toward the wall engaging surface. The hinge is spaced closer to the outermost end of the end portion than is the associated engaging face.

In accordance with still another aspect of the present invention, means are provided to resist substantial arcuate movement of the cleats outwardly beyond the first position when the cleats are in retaining engagement with a tubing valley. This provides a self energizing feature for the cleats which enhances retaining engagement between the tubing and coupler when a pull force is applied thereagainst and aids in preventing undesired uncoupling.

According to yet a further and more limited aspect of the present invention, the plurality of cleats comprise a single set of cleats spaced circumferentially around the end portion toward the outermost end thereof. This then facilitates the cleats all being received in the same valley of the associated tubing length.

In accordance with another aspect of the present invention, the coupler or joint includes a second end portion having a plurality of second cleats. This second end portion is adapted to be retainingly received in a second length of tubing similar to the first length for coupling the two lengths together.

According to a still further and more limited aspect of the present invention, the coupler or joint includes means for allowing relative flexure between the first and second end portions. This feature accommodates any necessary or desired bending at the coupler or joint for purposes of tubing installation.

The coupling arrangement of the subject invention is deemed to be an improvement on and provide many advantages over prior known coupling or joint constructions utilized for plastic pipe or tubing. While the primary advantage is considered to be in the fact that two lengths of plastic pipe may be positively locked together by internal means which will not interfere with automatic tube laying devices or machinery, other advantages, benefits and characteristics will also be apparent. For example, the coupler or joint does not adversely affect fluid flow capacity through the tubing, the joint has flexibility to accommodate desired or necessary bending and the cleats include a self-energizing feature which enhances retaining strength when a pull force is applied to the tubing.

Still other advantages and uses for the invention in the same or similar environments will become apparent to those skilled in the art upon a reading and understanding of the following specification.

BRIEF DESCRIPTION OF THE DRAWINGS

The invention may take physical form in certain parts and arrangements of parts, a preferred and alternative embodiment of which will be described in detail in the specification and illustrated in the accompanying drawings which form a part thereof and wherein.

DETAILED DESCRIPTION OF THE PREFERRED AND ALTERNATIVE EMBODIMENTS

Figure 1:
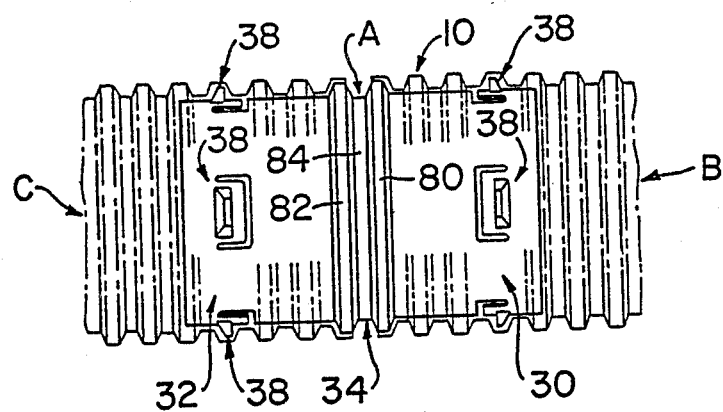
FIG. 1 is a side elevational view of the internal coupler installed as a joint between the ends of two lengths of corrugated plastic pipe with the pipe itself shown in phantom for ease of illustration.

Referring now to the drawings wherein the showings are for purposes of illustrating the preferred and alternative embodiments of the invention only and not for purposes of limiting same, FIG. 1 shows an internal coupler A utilized to join the adjacent open ends of a first length of corrugated tubing B and a second length of corrugated tubing C.

With regard to the construction of tubing lengths B and C, each comprises a hollow, generally cylindrical plastic pipe defined by a thin wall 10. This tubing is typically formed by conventional molding techniques such as blow molding or continuous extrusion from several different plastics such as high density polyethylene and polyvinylchloride. Wall 10 has an inner surface 12, an outer surface 14 and an open end 16. Inner surface 12 is corrugated and comprised of a plurality of alternating peaks 18 and valleys 20. The corrugations as defined by these peaks and valleys extend circumferentially about wall 10 of each tubing length.

Figure 3:
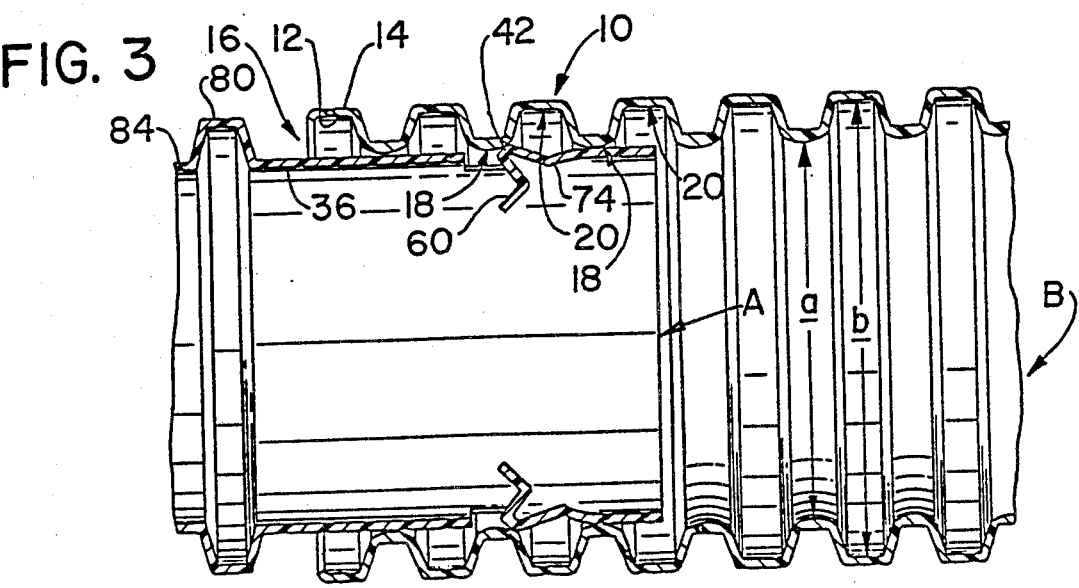
FIG. 3 is a partial cross-sectional view showing one end of the coupler as it is being inserted into the open end of a length of plastic pipe with the cleats moved toward their second position.

As shown in FIG. 1, outside surface 14 conventionally has a corrugated configuration generally similar to that of the inside surface. However, and for purposes of the subject invention, it is only necessary that the corrugated configuration be included on the inside surface adjacent open end 16 as will be more fully appreciated hereinafter. This then allows use of the invention for other types and styles of tubing configurations should it be desired. In the preferred arrangement here disclosed, and as best shown in FIG. 3, the minimum internal diameter of the pipe is the diametrical distance a measured between opposed peaks 18. The maximum internal diameter b is the diametrical distance between opposed valleys 20. Tubing lengths B and C may include a plurality of drainage openings (not shown) disposed longitudinally therealong and circumferentially therearound to facilitate ingress and egress of fluids as is known.

Figure 2:
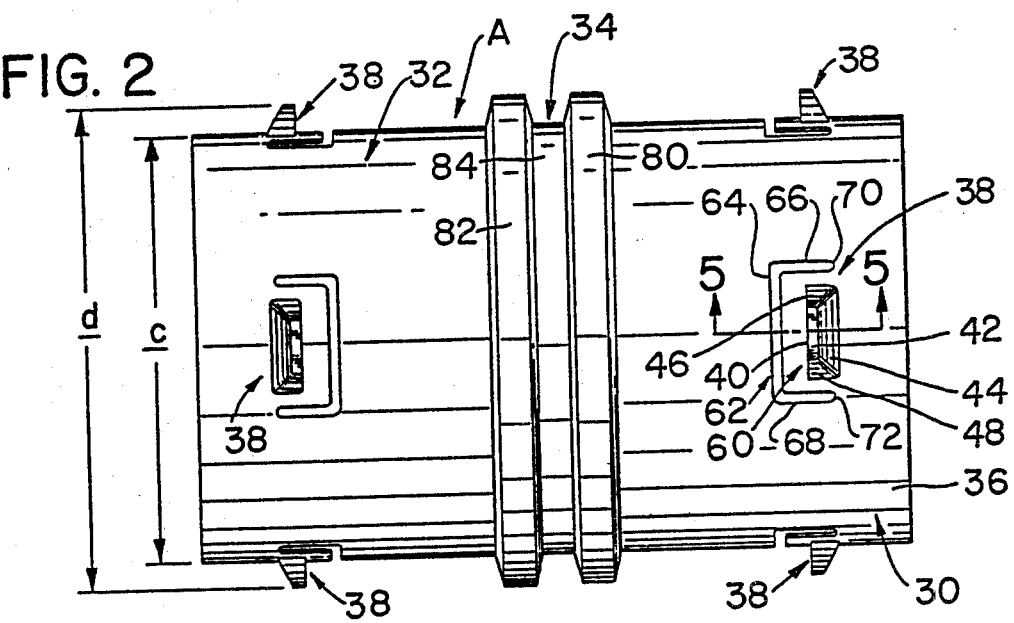
FIG. 2 is an enlarged side elevational view of the subject coupler.

With reference to FIG. 2, internal coupler A is comprised of a first end portion 30, a second end portion 32 opposed to the first end portion and a central portion 34 interposed between portions 30,32. Since end portions 30,32 are identical in construction description will hereinafter be made with reference to first end portion 30, it being understood that second end portion 32 is identical thereto unless otherwise noted. First end portion 30 is defined by a smooth walled and slightly elongated generally cylindrical thin walled body 36 which has a maximum outside diameter c slightly less than the minimum internal diameter a of tubing lengths B and C. This allows the first end portion to be received into tubing length B from the open end as will be described hereinafter.

Figure 5:
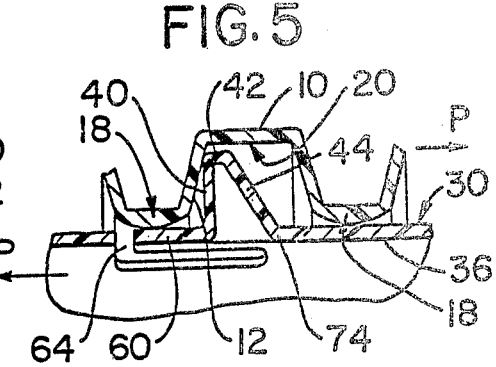
FIG. 5 is an enlarged cross-sectional view along lines 5—5 of FIG. 2 showing the relationship between a cleat and an associated corrugation valley.

A plurality of cleats 38 integrally formed within coupler A extend generally radially outward of first end portion 30. Since these cleats are identical to each other in the preferred embodiment here under discussion, description will hereinafter be made with regard to only one of them. With particular reference to FIGS. 2 and 5, each cleat 38 includes a corrugation engaging surface 40. As there shown, surface 40 is in its first position disposed generally normal to the surface of thin walled body 36 and includes an outermost end edge 42 with both surface 40 and edge area 42 extending generally transverse of body 36. A rear wall 44 tapers upwardly from body 36 and merges into outermost end edge area 42. Opposed side walls 46,48 similarly taper upwardly from body 36 to merge with engaging surface 40, outermost end edge area 42 and rear wall 44. As will be noted in FIG. 5, cleat 38 thus has the general configuration of a right triangle with engaging surface 40 which comprises one leg thereof spaced longitudinally toward central portion 34 from rear wall 44 which comprises the other leg thereof.

A tab or tongue-like member generally designated 60 extends outwardly from engaging surface 40 of the cleat generally coplanar with the adjacent portion of thin walled body 36. This tab or tongue-like member is defined by a slot generally designated 62 in body 36 comprised of a forward portion 64 and opposed side portions 66,68. The slot forward portion extends generally transverse of body 36 and parallel to the plane of engaging surface 40. Moreover, portion 64 is located such that tab or tongue-like member 60 will have a length sufficient to extend at least partially beneath a peak 18 when the coupler is installed in order to achieve selective self-energizing for the cleat in a manner which will be described hereinafter.

Slot side portions 66,68 are parallel to each other, generally normal to forward portion 64 and extend from the forward portion to slot ends 70,72. In the preferred arrangement, these slot ends are generally transversely aligned across body 36 with the interconnection of cleat rear wall 44 to thin walled body 36. The configuration of slot 62, however, may be varied from that shown without departing from the inventive aspects of the subject development. For example, the overall configuration of slot 62 could be generally arcuate or side portions 66,68 could diverse from each other as they extend outwardly from slot forward portion 64 toward slot ends 70,72. Further, slot ends 70,72 could be located at other positions from that shown in FIG. 2. As one example, side portions 66,68 could be somewhat longer than shown and extend beyond the area of interconnection between cleat rear wall 44 and thin walled body 36. Moreover, it would be possible if desired for some particular application to construct the coupler in a manner which eliminates tab or tongue-like member 60.

That area of body 36 extending between slot ends 70,72, including the area of interconnection between the body and cleat rear walls 44, defines a hinge surface 74 as is best shown in FIG. 5. This hinge allows selective arcuate movement of the cleat between a first normal position (FIG. 5) and a second position (FIG. 3) arcuately pivoted about hinge 74 with outermost end edge area 42 spaced more closely toward thin walled body 36. For reasons which will beome apparent in the subsequent description of coupler installation, cleats 38 are all integrally molded with coupler A in their first or normal positions.

With particular reference to the preferred embodiment illustrated in FIGS. 1 and 2, each of coupler first and second end portions 30,32 includes a single set of cleats 38 which are disposed circumferentially therearound and longitudinally spaced more closely toward the outermost ends of the end portions than to central portion 34. Also, four cleats 38 which are spaced 90° apart from each other are preferably utilized, although a greater or lesser number could also be employed. Thus, the cleats on each coupler end portion will be received in a single one of the associated tubing length valleys 20. The reason for this is that in some hot weather conditions, corrugated tubing will stretch easier than normal so that the pitch distance between valleys can actually increase. If the cleats were staggered along their respective end portions at fixed positions, they would not lockingly engage the tubing valleys in the proper manner in the event the tubing pitch has been varied. The 90° of rotation between the cleats provides equal retaining forces circumferentially around the coupler. Spacing of the cleat sets more closely to the outermost end of end portions 30,32 has also been found to be operationally advantageous. That is, the further the cleat location from the center of the coupler, the more difficult it is to detach the coupler by bending. The diametral distance between end edge areas 42 of opposed cleats when the cleats are in their first positions shown in FIGS. 1 and 2 is equal to d. This distance is greater than a and only slightly less than b.

In the preferred embodiment of the invention here under discussion, internal coupler A, including cleats 38, is preferably molded from high density polyethylene that resists acids, alkalis and frost. However, other platics and materials can be advantageously employed if so desired.

Referring particularly to FIG. 2, central portion 34 of coupling A includes a pair of corrugations 80,82 extending therearound and spaced apart from each other by a root area 84. In addition to providing continuity, these corrugations accommodate relative flexing or bending between first and second end portions 30,32. This then allows the joint area to be wholly compatible with the tubing lengths themselves and facilitates any necessary bending or flexing during tube laying or due to the nature of tubing installation itself. In the event it is deemed necessary or appropriate, a greater or lesser number of such corrugations could be included on central portion 34 without in any way departing from the overall intent or scope of the present invention. While a lesser number of such corrugations may not allow the same degree of flexibility, it may nevertheless be wholly satisfactory for many applications.

In addition, the outside diameter of corrugations 80,82 is slightly less than the maximum internal diameter b as measured between opposed tubing valleys 20. This, along with the relative spacing of the sets of cleats 38 from corrugations 80,82 allows internal coupler A to be installed into tubing lengths B and C regardless of where the tubing is cut to make the joint. For example, FIG. 4 shows the tubing where it has been cut at a valley 20 so that corrugation 80 is received thereinto at installation.

Figure 4:
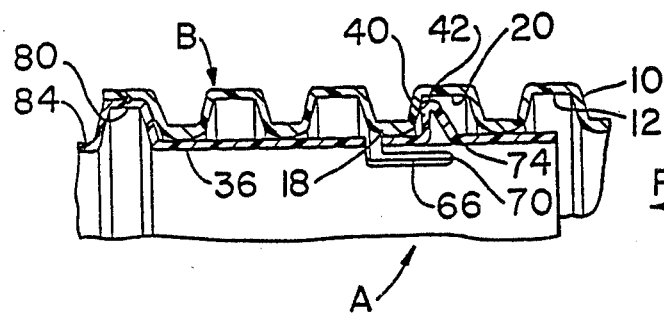
FIG. 4 is a partial cross-sectional view showing the coupler in a coupling relationship with a length of tubing and with a cleat in retaining engagement in a corrugation valley.

With particular reference to FIGS. 3, 4 and 5, description will hereinafter be made to installation and operation of the internal coupler with regard to typical ones of cleats 38. Since use of the coupler for coupling purposes is the same for both end portions 30,32, description will be made to installation of end portion 30 into first length of corrugated tubing B, it being appreciated that installation of second end portion 32 into second length of corrugated tubing C is identical thereto unless otherwise specifically noted.

In FIG. 3, the internal coupler is shown as having first end portion 30 partially inserted into tubing length B from open end 16 thereof. The outside diameter c of thin walled body 36 which defines first end portion 30 is slightly less than minimum tubing internal diameter a so as to allow such insertion. As the first end portion is being inserted, tubing peaks 18 coact with tapered rear walls 44 of the cleats so as to force the cleats arcuately about hinges 74 from the first or locking position toward the second position. Because of the resilient nature of the plastic material from which the internal coupler is constructed, the cleats are continuously urged toward the first position so that when aligned with a valley 20, they will automatically be moved back into the first or locking position as is shown in FIG. 4.

In FIG. 4, attention is directed to the fact that when the cleat there shown is in its locking position, tab or tongue-like member 60 extends forwardly from engaging surface 40 beneath the next adjacent peak 18 spaced toward open tubing end 16. While FIGS. 3 and 4 show this installation and locking with regard to only two and one cleats, respectively, it will be appreciated that all four cleats on first end portion 30 are positioned such that they are substantially simultaneously moved from the first to the second position and then from the second back to the first or locking position during coupler insertion into the tubing.

The above described shape and dimensioning of cleats 38 along with the inclusion of tab or tongue-like members 60 are such to render the cleats self energizing as well as to take advantage of the tensile hoop strength of the associated corrugated tubing peak 18. As shown in FIG. 5, a tension pull force P applied to either the corrugated tubing length or coupler attempts to uncouple or detach the joint. With the subject coupler, however, the pull force is transferred to the top of the cleat at generally the area of intersection between engaging surface 40 and the outermost end edge area 42. This causes a bending moment to be applied to the rear of the cleat about hinge 74. The bending moment is equal to the pull force multiplied by the height of engaging surface 40. The effect of this action is to energize the cleat by forcing it further into the associated valley 20 so that it grips the tubing even tighter. In the case of an extreme pull force, the cleat could deform and bend completely over backwards so that the tubing length could slip off the coupling. This type of behavior is minimized, however, by the protruding tab or tongue-like member 60 which engages the associated corrugation peak 18 to thus resist and greatly hinger any such backward bending.

The subject internal coupler construction does not significantly impair system fluid flow capacity which would otherwise be obtainable through the tubing itself if the joint was not present. Indeed, and by means of mathematical calculation, it has been determined that a smooth walled coupler having a $\frac{1}{8}$" smaller inside diameter than the minimum inside diameter a of corrugated tubing lengths B and C has approximately a 38% greater capacity for carrying full fluid flow than does the corrugated tubing itself. This result is due to the lower roughness coefficient of the smooth internal coupler wall. While the above noted calculation does not take into account the presence of corrugations 80,82 in central portion 34 or the so called end effect caused by the coupler having a smaller diameter than the minimum diameter a of the tubing, the 38% calculated margin provides sufficient latitude for error. Therefore, the coupler in no way significantly restricts flow through the associated corrugated tubing.

Figure 6:
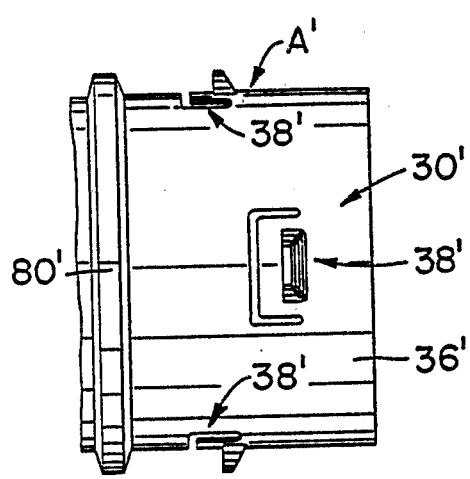
FIG. 6 is a side elevational view of one half of a coupler construction which incorporates a modified cleat location arrangement thereinto.

FIG. 6 shows a slightly modified arrangement for the placement and number of cleats. For ease of illustration in appreciating this modification, like components are identified by like numerals including a primed (') suffix and new components are identified by new numerals. Only one end portion of the coupler is illustrated, it being appreciated that the other end portion is identical thereto unless otherwise specifically noted.

In FIG. 6, end portion 30' includes two sets of cleats 38' thereon with each set, in turn, being comprised of a pair of diametrically opposed cleats. The cleats of one set are rotated 90° relative to the cleats of the other set and the two sets themselves are longitudinally spaced apart from each other along end portion 30'. The longitudinal spacing is such that the cleats of each set are received in different ones of the associated corrugated tubing valleys. The rotated relationship between the cleats of each set simply facilitates an even distribution of the tube length retaining forces.

As noted above, and while some difficulty could be encountered when using this coupler embodiment in hot weather where the pitch between adjacent corrugations could actually increase, this embodiment may still find advantageous use under appropriate conditions. It has been further found that when the tubing is subjected to bending stresses adjacent the coupler of FIG. 6, the propensity for uncoupling can be increased. That is, when the tubing is bent, that portion along the inside of the bend is put into compression while the outside is put into tension. The middle or central portion of the tubing is, therefore, not placed under any stress. With the staggered cleat arrangement of FIG. 6, it is possible that the more centrally located cleats could be on a line with a radius of bend to thus leave the rear cleats in the middle portion of the bend receiving no stress. Nevertheless, and even with this additional potential drawback, the embodiment of this FIGURE may be advantageously utilized under appropriate conditions.

Figure 7:
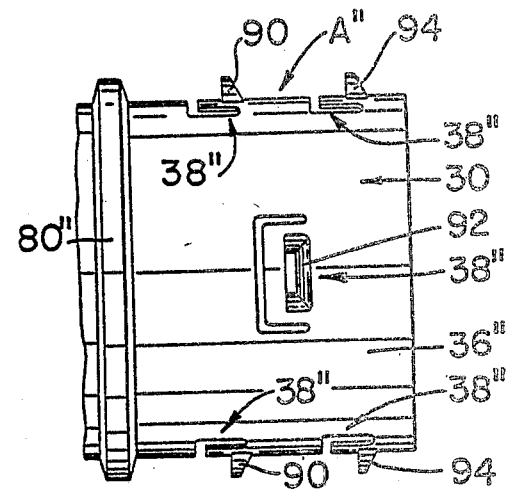
FIG. 7 is a side elevational view of one half of a coupler construction which incorporates another modified cleat location arrangement thereinto; and, FIG. 8 is a side elevational view in partial cross-section of a modified form of the invention where the coupler has been integrally formed in a length of corrugated plastic pipe.

FIG. 7 shows still another modified arrangement for the number and relative placement of the cleats. Here, like components are identified by like numerals with a double primed (") suffix and new components are identified by new numerals for ease of illustration.

With reference to FIG. 7, coupler A" incorporates three sets 90,92 and 94 of cleats 38". Each of these sets is comprised of a pair of diametrically opposed cleats with the cleats of set 92 being longitudinally spaced along first end portion 30" from the cleats of set 90 and the cleats of set 94 being similarly longitudinally spaced from the cleats of set 92. Moreover, the cleats of sets 90,94 are in axial alignment with each other. This arrangement provides additional gripping or holding strength for the coupler in the associated tubing length. The cleats of sets 90,92 and 94 are, of course, longitudinally spaced apart from each other along first end portion 30" so as to be received in different ones of the associated tubing valleys.

If desired, it would be possible to rotate the corresponding cleat sets of the internal coupler second end portion (not shown) 90° from those of the first end portion. In that event, the corresponding cleat sets 90,94 of the second end portion would be in longitudinal alignment with set 92 of first end portion 30" and the cleats of set 92 on the second end portion would be in longitudinal alignment with the cleats of sets 90,94 of first end portion 30".

Figure 8:
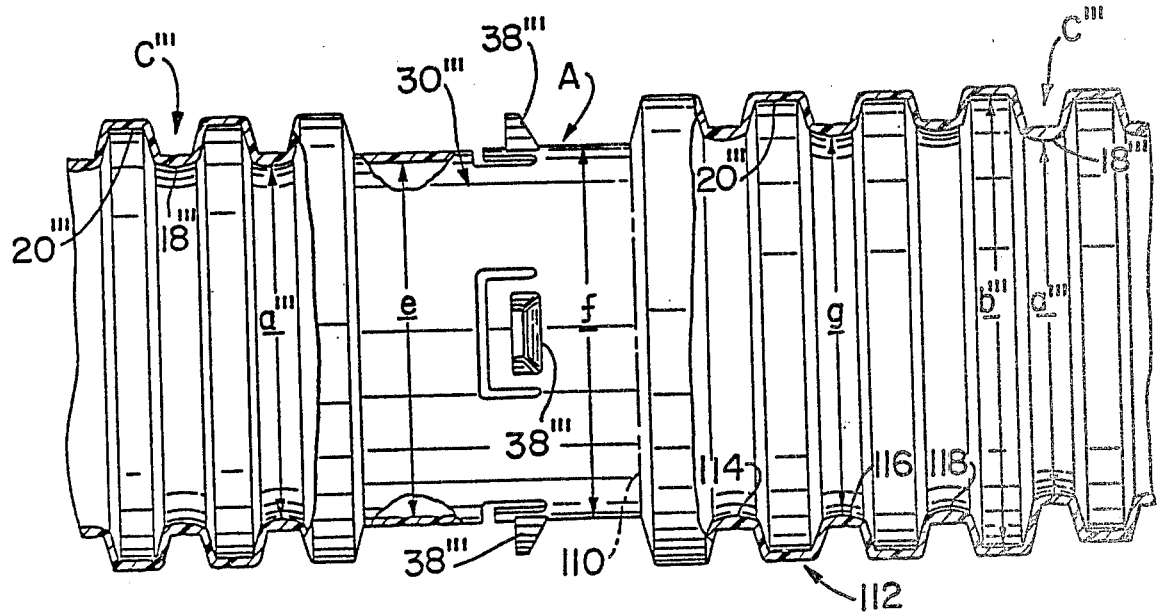

FIG. 8 shows a still further alternative arrangement where the coupler is integrally formed at the end of a typical corrugated tubing construction. Like components ae identified by like numerals with a triple primed (''') suffix and new components are identified by new numerals Here, first end portion 30''' of internal coupler A''' is shown as being integrally formed along a length of corrugated tubing intermediate two corrguated sections C''' thereof. Although only one internal coupler is shown, it will be appreciated that a plurality of such couplers could be advantageously formed at predetermined spaced intervals along a length of tubing. This then would allow a long length of the tubing to be cut into shorter lengths as required to accommodate particular installation requirements. Since coupler A''' is integrally formed in the tubing, separate coupler constructions such as those hereinabove described with reference to FIGS. 1–7 would not be required.

In FIG. 8, first end portion 30''' includes a single set of circumferentially spaced apart cleats 38''' in the same manner previously described. The outermost end area of end portion 30''' forms a cut-off area generally designated 110. From this cut-off area, the tubing resumes its corrugated configuration at the end area generally designated by numeral 112. In this particular alternative embodiment, and in order to prevent undesired fluid flow restrictions through the tubing at the area of coupler A''', the inside diameter e of the coupler is preferably made to have the same internal diameter a''' as the minimum inside diameter of the tubing, i.e., the diameter as measured between opposed internal peaks 18'''. This then necessitates a slight increase in the outside diameter f of the coupler so that it is slightly greater than diameter a'''.

To allow the coupler to be placed in coupling engagement with an associated length of tubing as at, for example, an end area 112 of such an associated length, it is necessary to slightly increase the minimum internal diameter of the tubing between those opposed internal peaks in area 112 which will be receiving coupler first end portion 30'''. In FIG. 8, this diameter is designated g which is greater than minimum tube inside diameter a''' and slightly greater than the outside diameter f of first end portion 30'''. The number of individual internal peaks having this slightly increased diameter is dependent upon the length of first end portion 30''' and the extent to which it is to be inserted into the associated length of tubing. For purposes of illustration, end area 112 is comprised of three internal peaks generally designated 114,116 and 118 which have diameter g.

When it is desired to employ the coupler A''' shown or another, similar coupler which is spaced along tubing C''', it is merely necessary to cut the tubing along cut-off area 110 and then clean up or deburr the area of the cut. Thereafter, first end portion 30''' of the coupler may be inserted into end area 112 of the desired associated length of tubing C'''. The locking engagement between cleats 38''' of the coupler body with the associated one of the internal valleys 20''' in end area 112 is the same as previously described hereinabove.

In addition to the structural arrangement specifically disclosed in FIG. 8, it would also be possible to integrally form first end portion 30''' of internal coupling A''' at the end of tubing length C''' of internal coupling A''' at the end of tubing length C'''. While the structure may not prove to be particularly feasible for extremely long lengths of tubing, it could be beneficial in the event a plurality of shorter lengths were manufactured with the intention that they would be assembled or joined to similar lengths to accommodate a particular installation. Thus, each length of the corrugated tubing would have a first end portion 30''' at one end and a conventional corrugated configuration at the other end appropriately dimensioned to lockingly receive the coupler first end portion of an associated tubing length.

The structure disclosed with general reference to FIG. 8 will require some special mold provisions for manufacturing purposes. However, because of the basic design of the subject coupler arrangement, these special provisions are not deemed to be as intricate as the corresponding special provisions required for those prior coupling arrangements which have been integrally formed with the tubing.

In addition to the preferred and alternative embodiments specifically described above with reference to FIGS. 1–8, the concepts of the subject invention may also be readily adapted into other types of coupler constructions. For example, the concepts could be utilized for elbows, tees, crosses and the like. Moreover, one end portion of the coupler could be dimensioned for installation into one size of corrugated tubing while the other end could be dimensioned for installation into yet another size of corrugated tubing to thereby act as a reducer. Still other modifications will become apparent to those skilled in the art.

The invention has been described with reference to the preferred and alternative embodiments. Obviously, modifications and alterations other than those specifically disclosed will occur to others upon the reading and understanding of the specification. It is our intention to include all such modifications and alterations insofar as they come within the scope of the appended claims or the equivalents thereof.

Having thus described our invention, we now claim:

1. A joint construction for plastic pipe comprising:
   first and second lengths of corrugated, hollow plastic tubing or pipe having an internal wall surface defined by adjacent circumferentially extending, longitudinally spaced peaks and valleys, said first and second lengths having end areas thereof disposed adjacent each other;
   a coupler member affixed to the end area of said first length with a portion thereof extending outwardly therefrom, said coupler member including a first end portion having a side wall configuration terminating in an outermost end, said first end portion dimensioned to be slidably received in the end area of said second length, said first end portion including a plurality of outwardly extending cleats received in retaining engagement in at least one valley of said second length;
   each said cleat including a tube engaging surface and means to allow selective resilient movement thereof generally about a cleat mounting axis disposed generally laterally across a portion of said coupler member first end portion between a first normal position with said engaging surface extending generally outward of said coupler first end portion side wall and a second position with said engaging surface spaced arcuately inward from said first position generally about said cleat mounting axis, each said cleat being forced from said first to said second position by engagement with said second length peaks as said coupler member first end portion is inserted thereinto and each said cleat being resiliently urged back toward said first position when it communicates with a second length valley, at least a portion of said engaging surface of each cleat being placed in retaining engagement with the wall portion of said second length extending between a selected one of said valleys and the next adjacent peak spaced toward said second length end area for retaining said first and second lengths in a coupled relationship with each other, said wall portion exerting force on said engaging surface of each said cleat which tends to urge said cleat outward from said first position under an axial uncoupling force which tends to pull said coupler member and said second length longitudinally apart from each other; and, means for resisting substantial movement outward from said first position generally about said cleat mounting axis of at least selected ones of said cleats under said axial uncoupling force.

2. The joint as defined in claim 1 wherein the engaging surfaces of said cleats are disposed generally normal to said coupler member first end portion side wall when said cleats are in said first position and wherein the axial uncoupling force will urge said cleats to be slightly arcuately moved outward from said first portion so that retaining engagement between said engaging surfaces and the associated second length wall portion will be increased.

3. The joint as defined in claim 1 wherein said cleats each have a rear wall spaced toward said first end portion outermost end from said engaging surface and tapering upwardly from said first end portion side wall at said cleat mounting axis toward said engaging surface, said resisting means being disposed on the other side of said engaging surface from said rear wall.

4. The joint as defined in claim 3 wherein each resisting means comprises a tab-like member extending from an associated cleat engaging face and dimensioned to extend beneath at least a portion of the next adjacent second length peak when said at least selected ones of said cleats are in retaining engagement with an associated second length valley.

5. The joint as defined in claim 4 wherein said coupler member is constructed from plastic and said cleats are integrally formed thereon, said tab-like members being integral with said cleat engaging surfaces and being defined by slot areas extending through said first end portion side wall, said cleats being continuously urged to said first position by the inherent resiliency of said plastic construction.

6. The joint as defined in claim 1 wherein said coupler member is integral with said first length at said first length end area.

7. The joint as defined in claim 1 wherein said coupler member is separately affixed to both said first and second lengths, said coupler member having a second end portion generally similar in configuration to said first end portion with a plurality of outward extending cleats received in retaining engagement in at least one of said first length valleys.

8. The joint as defined in claim 7 wherein said first and second end portions are generally opposed to each other and said coupler member includes a central portion intermediate said first and second end portions.

9. The joint as defined in claim 8 wherein said central portion includes means for allowing relative arcuate movement between said coupler member first and second portions to facilitate desired bending at said joint.

10. The joint as defined in claim 1 wherein said plurality of cleats comprise at least one set of cleats circumferentially spaced apart from each other around said first end portion side wall and received in the same one of said second length valleys.

11. The joint as defined in claim 10 wherein the cleats of said one set are positioned adjacent said first end portion outermost end.

12. The joint as defined in claim 10 wherein said at least one set of cleats comprises at least a pair of cleats sets with the cleats of said one set being longitudinally spaced apart along said first end portion side wall from the cleats of the other set in a manner such that the cleats of said one set are received in retaining engagement with a different one of said first length valleys than the cleats of said other set.

13. An internal coupler for joining adjacently spaced open ends of first and second lengths of generally cylindrical plastic tubing or pipe having internal wall surfaces defined by adjacent circumferentially extending, longitudinally spaced peaks and valleys with said first and second lengths having a minimum internal diameter a between said peaks and a maximum internal diameter b between said valleys, said coupler comprising:

a coupler body having generally opposed first and second end portions and a central portion disposed intermediate said first and second end portions, each of said first and second end portions terminating in an outer end and being defined by a generally cylindrical side wall having an outside diameter c at least slightly less than a for allowing said first and second coupler body end portions to be slidably received in the open ends of said first and second lengths; said central portion including at least one corrugation extending circumferentially around said central portion, said corrugation having an outside diameter greater than c whereby the corrugation is adapted to limit longitudinal insertions of one of the end portions into the open end of one of said first and second lengths; a plurality of cleats mounted on each of said first and second end portions extending outwardly from said end portion side walls, said cleats each having an engaging surface disposed toward said corrugation and terminating in an outermost cleat end, said cleats being selectively movable between a first normal position with said cleat engaging surfaces and outermost cleat ends disposed outwardly of said first and second end portion side walls such that the effective outside diameters of said end portions are equal to d which is greater than a but less than b and a second position with said engaging surfaces and outermost cleat ends spaced inwardly toward said first and second end portion side walls so that the effective outside diameter of said first and second end portions is approximately equal to a; and, means for continuously urging said cleats to said first position, whereby said first end portion is adapted to be longitudinally inserted into the open end of said first length and said second end portion is adapted to be inserted into the open end of said second length with said cleats being forced from said first to said second position by engagement with a peak of the associated first and second lengths during said insertion and then being moved back toward said first position under the influence of said urging means when in communication with a valley of the associated first and second lengths, at least a portion of the engaging surface of each cleat being adapted to be placed in retaining engagement with the wall portion of the associated one of said first and second lengths extending between a selected one of said valleys and next adjacent peak spaced toward the associated one of said first and second length open ends to thereby retain said lengths in a coupled relationship relative to each other.

14. The coupler as defined in claim 13 further including means for resisting substantial arcuate movement of at least selected ones of said cleats about said mounting axes outward beyond said first position.

15. The coupler as defined in claim 14 wherein the engaging surfaces of said cleats are disposed generally normal to the side wall of the associated first and second end portions when said cleats are in said first position and wherein a pull force tending to uncouple said lengths from said coupler member is adapted to cause said cleats to be slightly arcuately moved outward beyond said first position so that retaining engagement between said engaging surfaces and the associated tubing length wall portions will be increased.

16. The coupler as defined in claim 14 wherein said cleats each have a rear wall spaced toward the outer end of the associated one of the first and second end portions from said engaging surface and tapering upwardly from the side wall of the associated one of said first and second end portions at said cleat mounting axis toward said engaging surface, said resisting means being disposed on the other side of said engaging face from said rear wall.

17. The coupler as defined in claim 16 wherein said resisting means comprise tab-like members extending outwardly from the engaging surfaces of said selected ones of said cleats and adapted to extend beneath at least a portion of the next adjacent peak in the associated one of said first and second lengths when said cleats are in retaining engagement with the associated first and second length valleys.

18. The coupler as defined in claim 17 wherein said coupler member is constructed from plastic and said cleats are integrally formed therewith, said tab-like members being integral with said cleat engaging surfaces generally coplanar with said first and second end portion side walls when said cleats are in said first position, said tab-like members being defined by slot areas extending through said first and second end portion side walls with said urging means comprising the inherent resiliency of said plastic construction.

19. The coupler as defined in claim 13 wherein said central portion further includes at least a second circumferential, longitudinally spaced corrugation.

20. The coupler as defined in claim 13 wherein said plurality of cleats comprise at least one set of cleats on each of said coupler member first and second end portions adjacent the outer ends thereof with the cleats of each set being spaced apart from each other circumferentially around the associated one of said first and second end portions, said cleats adapted to be placed in retaining engagement with the same valley of the associated one of said first and second lengths.

21. A coupler adapted to couple a first length of hollow tubing or pipe to some associated structure and wherein said first length has internal corrugations defined by alternating peaks and valleys disposed at least substantially adjacent an open end thereof, said coupler comprising:

a coupler body having a first end portion terminating in an outer end and having a side wall dimensioned to be received in said first length from said open end; at least one cleat extending outwardly of said first portion side wall, said at least one cleat being mounted on said first portion side wall for selective arcuate movement between a first normal position extending outward of said first end portion side wall and a second position spaced arcuately inward from said first position generally about a cleat mounting axis, said cleat being hingedly attached to said first portion side wall generally along said mounting axis and beng generally unattached other than along the mounting axes and such that arcuate movement about the mounting axis is not substantially inhibited, said mounting axis being disposed generally between said cleat and said first outer end, and, means for continuously urging said cleats toward said first position, whereby said coupler first end portion is adapted to be longitudinally inserted into said first length open end in a manner such that said cleats will be forced from said first position toward said second position as they engage said first length peaks and will then be moved toward said first position by said urging means as they become aligned with said first length valleys, each said cleat adapted to be received in a selected first length valley for retaining said first length on said coupler body.

22. The coupler as defined in claim 21 wherein each cleat includes an engaging surface adapted to have at least a portion thereof engage that portion of a corrugation wall disposed between said selected first length valley and the next adjacent peak spaced toward said first length open end.

23. The coupler as defined in claim 22 wherein each cleat further includes a rear wall tapering outwardly from said first end portion side wall at said hinged attachment toward said engaging surface, said mounting axis being spaced closer to said first end portion outer end than said engaging surface.

24. The coupler as defined in claim 22 further including means for resisting substantial arcuate movement of said cleats outward beyond said first position when said cleats are in retaining engagement with the selected of said first length valleys.

25. The coupler as defined in claim 24 wherein said resisting means comprises a tab-like member on each cleat which extends outwardly from said engaging surface and is adapted to extend beneath the next adjacent peak spaced toward said first length open end from the selected of said first length valleys.

26. The coupler as defined in claim 21 wherein said plurality of cleats comprise at least one set of cleats circumferentially spaced apart from each other around said first end portion side wall adjacent said first portion outer end, said cleats of said one set adapted to be placed in retaining engagement with the same one of said first length valleys.

27. The coupler as defined in claim 21 further including means on said coupler body for allowing arcuate flexure between said coupler body and first end portion to accommodate first length bending at its interconnection with said coupler.

28. The coupler as defined in claim 21 further including a second end portion similar in configuration to said first portion and having a plurality of cleats disposed thereon, the cylindrical side wall of said second end portion and its cleats adapted to be received in the open end of a second length of tubing similar to said first length with the cleats of said second end portion adapted to be placed in retaining engagement with at least one selected second length valley for coupling said first and second lengths together.

29. The coupler as defined in claim 28 further including a central portion intermediate said first and second end portions.

30. The coupler as defined in claim 29 wherein said central portion includes means for allowing relative flexure between said coupler first and second end portions.

31. The coupler as defined in claim 21 wherein said coupler body is constructed from plastic with said cleats being integrally formed with and hinged to said one end portion, said urging means comprising the natural resiliency of said plastic construction at said cleat mounting axes.

32. An internal coupler comprising:
generally opposed first and second end portions and a central portion disposed intermediate said first and second end portions; said first end portion having a first end portion side wall terminating in a first end portion outermost end, said first end portion including at least a first outwardly extending cleat, said first cleat including an engaging surface disposed toward said central portion and a rear cammable wall disposed toward said first end portion outermost end, a first slot partially circumscribing said first cleat, said first slot having a first slot forward portion disposed between said engaging surface and said central portion, whereby said first cleat is resiliently moveable between a first normal position with said first cleat extending outwardly from said first end portion side wall and a second position with said cleat flexed arcuately inward at least partially below said first end portion side wall.

33. The internal coupler as defined in claim 32 wherein said central portion includes means for allowing relative arcuate movement between the first and second end portions to accommodate desired bending of the coupler.

34. The internal coupler as defined in claim 33 wherein said means for allowing relative arcuate movement comprises a plurality of corrugations.

35. The internal coupler as defined in claim 32 wherein said second end portion has a second end portion side wall terminating in a second end portion outermost end, said second end portion including at least a second outwardly extending cleat, said second cleat including an engaging surface disposed toward said central portion and a rear cammable wall disposed toward said second end portion outermost end, a second slot partially circumscribing said second cleat, said second slot having a second slot forward portion disposed between said engaging surface and said central portion, whereby said second cleat is resiliently movable between a first normal position with said second cleat extending outwardly from said second end portion side wall and a second position with said second cleat flexed arcuately inward.

36. The internal coupler as defined in claim 32 wherein said first slot forward portion is displaced from said first cleat to define a first tab-like member for resisting flexing of the first cleat arcuately outward when the coupler is inserted in an open end of corrugated tubing.

37. An internal coupling construction adapted to join an open end of a first length of hollow, corrugated tubing or pipe with some associated structure, said coupling construction comprising a first end portion dimensioned to be longitudinally inserted in the open end of the first length, a first corrugation disposed adjacent said first end portion for limiting longitudinal insertion of the first end portion into the open end of the first length, at least a first cleat extending outward from said first end portion, a first generally U-shaped slot partially surrounding said first cleat, said first generally U-shaped slot and said first cleat defining a tab-like member generally between the first slot and the first cleat.

38. The internal coupling construction as defined in claim 37 further comprising a second end portion dimensioned to be received in said associated structure, a second corrugation disposed adjacent said second end portion for limiting receipt of the second end portion into the associated structure, at least a second cleat extending outward from said second generally U-shaped slot partially surrounding said second cleat, said second U-shaped slot and said second cleat defining a tab-like member generally between the second slot and the second cleat.

39. The internal coupling construction as defined in claim 37 wherein said first and second slots are generally arcuate.

40. The internal coupling construction as defined in claim 37 wherein said first and second slots are formed from a plurality of linear segments.

* * * * *